(12) United States Patent
Hotelling

(10) Patent No.: US 7,511,702 B2
(45) Date of Patent: *Mar. 31, 2009

(54) FORCE AND LOCATION SENSITIVE DISPLAY

(75) Inventor: Steve Porter Hotelling, San Jose, CA (US)

(73) Assignee: Apple Inc., Cupertino, CA (US)

( * ) Notice: Subject to any disclaimer, the term of this patent is extended or adjusted under 35 U.S.C. 154(b) by 246 days.

This patent is subject to a terminal disclaimer.

(21) Appl. No.: 11/382,402

(22) Filed: May 9, 2006

(65) Prior Publication Data

US 2007/0236466 A1    Oct. 11, 2007

Related U.S. Application Data

(63) Continuation-in-part of application No. 11/278,080, filed on Mar. 30, 2006.

(51) Int. Cl.
*G09G 5/00* (2006.01)
(52) U.S. Cl. ............ 345/173; 345/174; 178/18.06
(58) Field of Classification Search ......... 345/173–179; 178/18.01, 18.03, 18.06
See application file for complete search history.

(56) References Cited

U.S. PATENT DOCUMENTS

| | | | |
|---|---|---|---|
| 3,333,160 A | 7/1967 | Gorski | |
| 3,541,541 A | 11/1970 | Englebart | |
| 3,662,105 A | 5/1972 | Hurst et al. | |
| 3,798,370 A | 3/1974 | Hurst | |
| 4,246,452 A | 1/1981 | Chandler | 200/5 |
| 4,370,697 A | 1/1983 | Haberl et al. | |
| 4,526,043 A | 7/1985 | Boie et al. | |
| 4,550,221 A | 10/1985 | Mabusth | 178/18 |
| 4,672,364 A | 6/1987 | Lucas | 340/365 P |
| 4,672,558 A | 6/1987 | Beckes et al. | 364/518 |
| 4,692,809 A | 9/1987 | Beining et al. | 358/247 |
| 4,695,827 A | 9/1987 | Beining et al. | 340/365 P |

(Continued)

FOREIGN PATENT DOCUMENTS

CA       1243096       10/1988       ........... 340/180

(Continued)

OTHER PUBLICATIONS

U.S. Appl. No. 10/654,108, filed Sep. 2, 2003.

(Continued)

*Primary Examiner*—Regina Liang
(74) *Attorney, Agent, or Firm*—Morrison & Foerster LLP

(57) ABSTRACT

A unit to provide both force and location detection includes a first transparent substrate (having first and second sets of conductive traces oriented in a first direction), a second transparent substrate (having a third set of conductive traces oriented in a second direction) and a plurality of deformable members (e.g., rubber beads) arranged between the first and second transparent substrates. The first set of conductive traces, in combination with the conductive traces of the second transparent element, provide a capacitance signal representing where a user touches the display element. The second set of conductive traces, in combination with the conductive traces of the second transparent element, provide a capacitance signal representing the amount of force applied to the display element. When used with a display element (e.g., a LCD or CRT), an input-output unit capable of both location sensing and force sensing operations is provided.

51 Claims, 4 Drawing Sheets

U.S. PATENT DOCUMENTS

| | | | |
|---|---|---|---|
| 4,733,222 A | 3/1988 | Evans | 340/365 C |
| 4,734,685 A | 3/1988 | Watanabe | 340/710 |
| 4,746,770 A | 5/1988 | McAvinney | 178/18 |
| 4,771,276 A | 9/1988 | Parks | 340/712 |
| 4,788,384 A | 11/1988 | Bruere-Dawson et al. | 178/18 |
| 4,806,846 A | 2/1989 | Kerber | 324/60 CD |
| 4,898,555 A | 2/1990 | Sampson | 445/22 |
| 4,968,877 A | 11/1990 | McAvinney et al. | 250/221 |
| 5,003,519 A | 3/1991 | Noirjean | 368/73 |
| 5,010,772 A | 4/1991 | Bourland et al. | |
| 5,017,030 A | 5/1991 | Crews | 400/485 |
| 5,178,477 A | 1/1993 | Gambaro | 400/489 |
| 5,189,403 A | 2/1993 | Franz et al. | 340/711 |
| 5,194,862 A | 3/1993 | Edwards | 341/20 |
| 5,224,861 A | 7/1993 | Glass et al. | 434/35 |
| 5,241,308 A | 8/1993 | Young | |
| 5,252,951 A | 10/1993 | Tannenbaum et al. | 345/156 |
| 5,281,966 A | 1/1994 | Walsh | 341/22 |
| 5,305,017 A | 4/1994 | Gerpheide | 345/174 |
| 5,345,543 A | 9/1994 | Capps et al. | 395/137 |
| 5,376,948 A | 12/1994 | Roberts | |
| 5,398,310 A | 3/1995 | Tchao et al. | 395/144 |
| 5,442,742 A | 8/1995 | Greyson et al. | 395/146 |
| 5,447,074 A | 9/1995 | Polaert et al. | |
| 5,463,388 A | 10/1995 | Boie et al. | 341/33 |
| 5,463,696 A | 10/1995 | Beernink et al. | 382/186 |
| 5,483,261 A | 1/1996 | Yasutake | 345/173 |
| 5,488,204 A | 1/1996 | Mead et al. | 178/18 |
| 5,495,077 A | 2/1996 | Miller et al. | 178/18 |
| 5,510,813 A * | 4/1996 | Makinwa et al. | 345/173 |
| 5,513,309 A | 4/1996 | Meier et al. | 395/155 |
| 5,523,775 A | 6/1996 | Capps | 345/179 |
| 5,530,455 A | 6/1996 | Gillick et al. | 345/163 |
| 5,543,590 A | 8/1996 | Gillespie et al. | 178/18 |
| 5,543,591 A | 8/1996 | Gillespie et al. | 178/18 |
| 5,563,632 A | 10/1996 | Roberts | 345/173 |
| 5,563,996 A | 10/1996 | Tchao | 395/144 |
| 5,565,658 A | 10/1996 | Gerpheide et al. | 178/19 |
| 5,579,036 A | 11/1996 | Yates, IV | 345/173 |
| 5,581,681 A | 12/1996 | Tchao et al. | 395/804 |
| 5,583,946 A | 12/1996 | Gourdol | 382/187 |
| 5,590,219 A | 12/1996 | Gourdol | 382/202 |
| 5,592,566 A | 1/1997 | Pagallo et al. | 382/187 |
| 5,594,810 A | 1/1997 | Gourdol | 382/187 |
| 5,596,694 A | 1/1997 | Capps | 395/152 |
| 5,612,719 A | 3/1997 | Beernink et al. | 345/173 |
| 5,631,805 A | 5/1997 | Bonsall | 361/681 |
| 5,633,955 A | 5/1997 | Bozinovic et al. | 381/187 |
| 5,634,102 A | 5/1997 | Capps | 395/334 |
| 5,636,101 A | 6/1997 | Bonsall et al. | 361/681 |
| 5,642,108 A | 6/1997 | Gopher et al. | 341/22 |
| 5,644,657 A | 7/1997 | Capps et al. | 382/229 |
| 5,648,642 A | 7/1997 | Miller et al. | |
| 5,666,113 A | 9/1997 | Logan | 341/34 |
| 5,666,502 A | 9/1997 | Capps | 345/352 |
| 5,666,552 A | 9/1997 | Greyson et al. | 395/802 |
| 5,675,361 A | 10/1997 | Santilli | 345/168 |
| 5,677,710 A | 10/1997 | Thompson-Rohrlich | 345/173 |
| 5,689,253 A | 11/1997 | Hargreaves et al. | 341/22 |
| 5,710,844 A | 1/1998 | Capps et al. | 382/317 |
| 5,729,250 A | 3/1998 | Bishop et al. | 345/175 |
| 5,730,165 A | 3/1998 | Philipp | 137/1 |
| 5,736,976 A | 4/1998 | Cheung | 345/168 |
| 5,741,990 A | 4/1998 | Davies | 84/423 R |
| 5,745,116 A | 4/1998 | Pisutha-Arnond | 345/358 |
| 5,745,716 A | 4/1998 | Tchao et al. | 395/350 |
| 5,746,818 A | 5/1998 | Yatake | 106/31.86 |
| 5,748,269 A | 5/1998 | Harris et al. | 349/58 |
| 5,764,222 A | 6/1998 | Shieh | 345/173 |
| 5,767,457 A | 6/1998 | Gerpheide et al. | 178/18 |
| 5,767,842 A | 6/1998 | Korth | 345/168 |
| 5,790,104 A | 8/1998 | Shieh | 345/173 |
| 5,790,107 A | 8/1998 | Kasser et al. | 345/174 |
| 5,801,340 A * | 9/1998 | Peter | 178/20.04 |
| 5,802,516 A | 9/1998 | Shwarts et al. | 707/6 |
| 5,808,567 A | 9/1998 | McCloud | 341/20 |
| 5,809,267 A | 9/1998 | Moran et al. | 395/358 |
| 5,821,690 A | 10/1998 | Martens et al. | 313/506 |
| 5,821,930 A | 10/1998 | Hansen | 345/340 |
| 5,823,782 A | 10/1998 | Marcus et al. | 434/156 |
| 5,825,351 A | 10/1998 | Tam | |
| 5,825,352 A | 10/1998 | Bisset et al. | 345/173 |
| 5,841,078 A * | 11/1998 | Miller et al. | 345/173 |
| 5,854,625 A | 12/1998 | Frisch et al. | |
| 5,880,411 A | 3/1999 | Gillespie et al. | 178/18.01 |
| 5,898,434 A | 4/1999 | Small et al. | 345/348 |
| 5,920,309 A | 7/1999 | Bisset et al. | 345/173 |
| 5,923,319 A | 7/1999 | Bishop et al. | 345/175 |
| 5,933,134 A | 8/1999 | Shieh | 345/173 |
| 5,942,733 A * | 8/1999 | Allen et al. | 178/18.01 |
| 5,943,044 A | 8/1999 | Martinelli et al. | |
| 6,002,389 A | 12/1999 | Kasser | |
| 6,002,808 A | 12/1999 | Freeman | 382/288 |
| 6,020,881 A | 2/2000 | Naughton et al. | 345/327 |
| 6,031,524 A | 2/2000 | Kunert | 345/173 |
| 6,037,882 A | 3/2000 | Levy | 341/20 |
| 6,050,825 A | 4/2000 | Nichol et al. | 434/227 |
| 6,052,339 A | 4/2000 | Frenkel et al. | 368/230 |
| 6,072,494 A | 6/2000 | Nguyen | 345/358 |
| 6,084,576 A | 7/2000 | Leu et al. | 345/168 |
| 6,107,997 A | 8/2000 | Ure | 345/173 |
| 6,128,003 A | 10/2000 | Smith et al. | 345/157 |
| 6,131,299 A | 10/2000 | Raab et al. | 33/503 |
| 6,135,958 A | 10/2000 | Mikula-Curtis et al. | 600/443 |
| 6,144,380 A | 11/2000 | Schwarts et al. | 345/350 |
| 6,188,391 B1 | 2/2001 | Seely et al. | |
| 6,198,515 B1 | 3/2001 | Cole | 348/836 |
| 6,208,329 B1 | 3/2001 | Ballare | 345/173 |
| 6,222,465 B1 | 4/2001 | Kumar et al. | 341/20 |
| 6,239,790 B1 | 5/2001 | Martinelli et al. | |
| 6,243,071 B1 | 6/2001 | Shwarts et al. | 345/146 |
| 6,246,862 B1 | 6/2001 | Grivas et al. | 455/90 |
| 6,249,606 B1 | 6/2001 | Kiraly et al. | 382/195 |
| 6,288,707 B1 | 9/2001 | Philipp | 345/168 |
| 6,289,326 B1 | 9/2001 | LaFleur | 705/702 |
| 6,292,178 B1 | 9/2001 | Bernstein et al. | 345/173 |
| 6,323,846 B1 | 11/2001 | Westerman et al. | |
| 6,347,290 B1 | 2/2002 | Bartlett | 702/150 |
| 6,377,009 B1 | 4/2002 | Philipp | 318/468 |
| 6,380,931 B1 | 4/2002 | Gillespie et al. | 345/173 |
| 6,411,287 B1 | 6/2002 | Scharff et al. | 345/177 |
| 6,414,671 B1 | 7/2002 | Gillespie et al. | 345/157 |
| 6,421,234 B1 | 7/2002 | Ricks et al. | 361/683 |
| 6,452,514 B1 | 9/2002 | Philipp | 341/33 |
| 6,457,355 B1 | 10/2002 | Philipp | 73/304 |
| 6,466,036 B1 | 10/2002 | Philipp | 324/678 |
| 6,515,669 B1 | 2/2003 | Mohri | 345/474 |
| 6,525,749 B1 | 2/2003 | Moran et al. | 345/863 |
| 6,535,200 B2 | 3/2003 | Philipp | 345/168 |
| 6,543,684 B1 | 4/2003 | White et al. | 234/379 |
| 6,543,947 B2 | 4/2003 | Lee | 400/489 |
| 6,570,557 B1 | 5/2003 | Westerman et al. | |
| 6,593,916 B1 | 7/2003 | Aroyan | |
| 6,610,936 B2 | 8/2003 | Gillespie et al. | 178/18.01 |
| 6,624,833 B1 | 9/2003 | Kumar et al. | 345/863 |
| 6,639,577 B2 | 10/2003 | Eberhard | 345/102 |
| 6,650,319 B1 | 11/2003 | Hurst et al. | |
| 6,658,994 B1 | 12/2003 | McMillan | 99/468 |
| 6,670,894 B2 | 12/2003 | Mehring | 341/22 |
| 6,677,932 B1 | 1/2004 | Westerman | |
| 6,677,934 B1 | 1/2004 | Blanchard | 345/173 |
| 6,724,366 B2 | 4/2004 | Crawford | 345/157 |
| 6,757,002 B1 | 6/2004 | Oross et al. | 345/864 |
| 6,803,906 B1 | 10/2004 | Morrison et al. | 345/173 |

| | | |
|---|---|---|
| 6,842,672 B1 | 1/2005 | Straub et al. .................. 701/3 |
| 6,856,259 B1 | 2/2005 | Sharp |
| 6,888,536 B2 | 5/2005 | Westerman et al. |
| 6,900,795 B1 | 5/2005 | Knight, III et al. .......... 345/173 |
| 6,919,882 B2* | 7/2005 | Lin ............................ 345/174 |
| 6,927,761 B2 | 8/2005 | Badaye et al. ............... 345/173 |
| 6,942,571 B1 | 9/2005 | McAllister et al. ............ 463/20 |
| 6,965,375 B1 | 11/2005 | Gettemy et al. .............. 345/173 |
| 6,972,401 B2 | 12/2005 | Akitt et al. .................. 250/221 |
| 6,977,666 B1 | 12/2005 | Hedrick ...................... 345/690 |
| 6,985,801 B1 | 1/2006 | Straub et al. .................. 701/3 |
| 6,992,659 B2 | 1/2006 | Gettemy ..................... 345/173 |
| 7,030,860 B1* | 4/2006 | Hsu et al. ................... 345/173 |
| 7,031,228 B2 | 4/2006 | Born et al. .................... 368/69 |
| 2001/0046604 A1* | 11/2001 | Geaghan |
| 2002/0015024 A1 | 2/2002 | Westerman et al. |
| 2002/0094660 A1 | 7/2002 | Getz et al. |
| 2002/0118848 A1 | 8/2002 | Karpenstein ................ 381/119 |
| 2003/0006974 A1 | 1/2003 | Clough et al. ............... 345/179 |
| 2003/0071794 A1 | 4/2003 | Arakawa et al. |
| 2003/0076301 A1 | 4/2003 | Tsuk et al. .................. 345/159 |
| 2003/0076303 A1 | 4/2003 | Huppi ........................ 345/163 |
| 2003/0076306 A1 | 4/2003 | Zadesky et al. ............. 345/173 |
| 2003/0095095 A1 | 5/2003 | Pihlaja ....................... 345/156 |
| 2003/0095096 A1 | 5/2003 | Robbin et al. ............... 345/156 |
| 2003/0098858 A1 | 5/2003 | Perski et al. ................ 345/173 |
| 2003/0206202 A1 | 11/2003 | Moriya ....................... 345/846 |
| 2003/0234768 A1 | 12/2003 | Rekimoto et al. ........... 345/169 |
| 2003/0234769 A1* | 12/2003 | Cross et al. ................. 345/173 |
| 2004/0090429 A1 | 5/2004 | Geaghan et al. |
| 2004/0119701 A1 | 6/2004 | Mulligan et al. |
| 2004/0263484 A1 | 12/2004 | Montysalo et al. .......... 345/173 |
| 2005/0012723 A1 | 1/2005 | Pallakoff .................... 345/173 |
| 2005/0052425 A1 | 3/2005 | Zadesky et al. ............. 345/173 |
| 2005/0104867 A1 | 5/2005 | Westerman et al. ......... 345/173 |
| 2005/0110768 A1 | 5/2005 | Marriott et al. ............. 345/173 |
| 2006/0022955 A1 | 2/2006 | Kennedy .................... 345/173 |
| 2006/0022956 A1 | 2/2006 | Lengeling |
| 2006/0026353 A1 | 2/2006 | Hotelling |
| 2006/0026521 A1 | 2/2006 | Hotelling |
| 2006/0026535 A1 | 2/2006 | Hotelling et al. ............ 715/863 |
| 2006/0026536 A1 | 2/2006 | Hotelling |
| 2006/0032680 A1 | 2/2006 | Elias et al. ............... 178/18.06 |
| 2006/0033724 A1 | 2/2006 | Chaudhri et al. ............ 345/173 |
| 2006/0053387 A1 | 3/2006 | Ording ....................... 715/773 |
| 2006/0066582 A1 | 3/2006 | Lyon et al. .................. 345/173 |
| 2006/0085757 A1 | 4/2006 | Andre et al. ................ 715/771 |
| 2006/0097991 A1 | 5/2006 | Hotelling et al. ............ 345/173 |
| 2006/0197753 A1 | 9/2006 | Hotelling .................... 345/173 |
| 2007/0229464 A1* | 10/2007 | Hotelling et al. ............ 345/173 |

FOREIGN PATENT DOCUMENTS

| | | |
|---|---|---|
| CN | 1675653 | 9/2005 |
| DE | 102 51 296 | 5/2004 |
| EP | 0483519 | 5/1992 |
| EP | 0 288 692 | 7/1993 |
| EP | 0 664 504 | 1/1995 |
| EP | 0 464 908 | 9/1996 |
| EP | 1 014 295 | 1/2002 |
| EP | 1469415 | 10/2004 |
| WO | 97/18547 | 5/1997 |
| WO | 97/23738 | 7/1997 |
| WO | 98/14863 | 4/1998 |
| WO | 03/088176 | 10/2003 |
| WO | 2006/023569 | 3/2006 |

OTHER PUBLICATIONS

U.S. Appl. No. 10/789,676, filed Feb. 27, 2004.
"Touch Technologies Overview." 2001, 3M Touch Systems, Massachusetts.
"Touchscreen Technology Choices." http://www.elotouch.com. products/detech2.asp. downloaded Aug. 5, 2005.
Jun Rekimoto. "SmartSkin: An Infrastructure for Freehand Manipulation on Interactive Surfaces." CHI 2002. Apr. 20-22, 2002. Minneapolis, Minnesota.
"Wacom Components—Technology." http://www.wacom-components.com/english/tech.asp. downloaded Oct. 10, 2004.
"Comparing Touch Technologies." http://www.touchscreens.com/intro-touchtypes.html. downloaded Oct. 10, 2004.
"GlidePoint(r)." http://www.cirque.com/technology/technology_gp.htm. downloaded Aug. 5, 2005.
"Captive Position Sensing." http://www.synaptics.com/technology/cps.cfm. downloaded Aug. 5, 2005.
"How Do Touchscreens Monitors Know Where You're Touching?" http://electronics.howstuffworks.com/question716.htm. downloaded Aug. 5, 2005.
"How Does a Touchscreen Work?" http://touchscreens.com/intro-anatomy.html. downloaded Aug. 5, 2005.
"4-Wire Resistive Touchscreens." http://www/touchscreens.com/intro-touchtypes-4resistive.html. downloaded Aug. 5, 2005.
"5-Wire Resistive Touchscreens." http://www.touchscreens.com/intro-touchtypes-resistive.html. downloaded Aug. 5, 2005.
"Capacitive Touchscreens." http://www. touchscreens.com/intro-touchtypes-capacitive.html. downloaded Aug. 5, 2005.
"PenTouch Capacitive Touchscreens." http://www.touchscreens.com/intro-touchtypes-pentouch.html. downloaded Aug. 5, 2005.
"Surface Acoustic Wave Touchscreens." http://www.touchscreens.com/intro-touchtypes-saw.html. downloaded Aug. 5, 2005.
"Near Field Imaging Touchscreens." http://www.touchscreens.com/intro-touchtypes-nfi.html. downloaded Aug. 5, 2005.
"Infrared Touchscreens." http://www.touchscreens.com/intro-touchtypes-infrared.html. downloaded Aug. 5, 2005.
"Watershed Algorithm." http://www.rsb.info.nih.gov/ij/plugins/watershed.html. downloaded Aug. 5, 2005.
U.S. Appl. No. 10/654,108, filed Sep. 2, 2003, entitled "Ambidextrous Mouse".
U.S. Appl. No. 10/789,676, filed on Feb. 27, 2004, entitled "Shape Detecting Input Device".
"4-Wire Resistive Touchscreens" obtained from http://www.touchscreens.com/intro-touchtypes-4resistive.html generated Aug. 5, 2005.
"5-Wire Resistive Touchscreens" obtained from http://www.touchscreens.com/intro-touchtypes-resistive.html generated Aug. 5, 2005.
"A Brief Overview of Gesture Recognition" obtained from http://www.dai.ed.ac.uk/Cvonline/LOCA_COPIES/COHEN/gesture_overview.html, generated Apr. 20, 2004.
"Capacitive Touchscreens" obtained from http://www.touchscreens.com/intro-touchtypes-capacitive.html generated Aug. 5, 2005.
"Capacitive Position Sensing" obtained from http://www.synaptics.com/technology/cps.cfm generated Aug. 5, 2005.
"Comparing Touch Technologies" obtained from http://www.touchscreens.com/intro-touchtypes.html generated Oct. 10, 2004.
"Gesture Recognition" http://www.fingerworks.com/gesture_recognition.html.
"GlidePoint®" obtained from http://www.cirque.com/technology/technology_gp.html generated Aug. 5, 2005.
"How do touchscreen monitors know where you're touching?" obtained from http://www.electronics.howstuffworks.com/question716.html generated Aug. 5, 2005.
"How does a touchscreen work?" obtained from http://www.touchscreens.com/intro-anatomy.html generated Aug. 5, 2005.
"iGesture Products for Everyone (learn in minutes) Product Overview" FingerWorks.com.
"Infrared Touchscreens" obtained from http://www.touchscreens.com/intro-touchtypes-infrared.html generated Aug. 5, 2005.
"Mouse Emulation" FingerWorks obtained from http://www.fingerworks.com/gesture_guide_mouse.html generated Aug. 30, 2005.
"Mouse Gestures in Opera" obtained from http://www.opera.com/products/desktop/mouse/index.dml generated Aug. 30, 2005.
"Mouse Gestures," Optim oz, May 21, 2004.
"MultiTouch Overview" FingerWorks obtained from http://www.fingerworks.com/multoverview.html generated Aug. 30, 2005.

"Near Field Imaging Touchscreens" obtained from http://www.touchscreens.com/intro-touchtypes-nfi.html generated Aug. 5, 2005.
"PenTouch Capacitive Touchscreens" obtained from http://www.touchscreens.com/intro-touchtypes-pentouch.html generated Aug. 5, 2005.
"Surface Acoustic Wave Touchscreens" obtained from http://www.touchscreens.com/intro-touchtypes-saw.html generated Aug. 5, 2005.
"Symbol Commander" obtained from http://www.sensiva.com/symbolcomander/. generated Aug. 30, 2005.
"Tips for Typing" FingerWorks http://www.fingerworks.com/mini_typing.html generated Aug. 30, 2005.
"Touch Technologies Overview" 2001, 3M Touch Systems, Massachusetts.
"Wacom Components—Technology" obtained from http://www.wacom-components.com/english/tech.asp generated on Oct. 10, 2004.
"Watershed Algorithm" http://rsb.info.nih.gov/ij/plugins/watershed.html generated Aug. 5, 2005.
"FingerWorks—Gesture Guide—Application Switching," obtained from http://www.fingerworks.com/gesture_guide_apps.html, generated on Aug. 27, 2004, 1-pg.
"FingerWorks—Gesture Guide—Editing," obtained from http://www.fingerworks.com/gesure_guide_editing.html, generated on Aug. 27, 2004, 1-pg.
"FingerWorks—Gesture Guide—File Operations," obtained from http://www.fingerworks.com/gesture_guide_files.html, generated on Aug. 27, 2004, 1-pg.
"FingerWorks—Gesture Guide—Text Manipulation," obtained from http://www.fingerworks.com/gesture_guide_text_manip.html, generated on Aug. 27, 2004, 2-pg.
"FingerWorks—Gesture Guide—Tips and Tricks," obtained from http://www.fingerworks.com/gesture_guide_tips.html, generated Aug. 27, 2004, 2-pgs.
"FingerWorks—Gesture Guide—Web," obtained from http://www.fingerworks.com/gesture_guide_web.html, generated on Aug. 27, 2004, 1-pg.
"FingerWorks—Guide to Hand Gestures for USB Touchpads," obtained from http://www.fingerworks.com/igesture_userguide.html, generated Aug. 27, 2004, 1-pg.
"FingerWorks—iGesture—Technical Details," obtained from http://www.fingerworks.com/igesture_tech.html, generated Aug. 27, 2004, 1-pg.
"FingerWorks—The Only Touchpads with Ergonomic Full-Hand Resting and Relaxation!" obtained from http://www.fingerworks.com/resting.html, Copyright 2001, 1-pg.
"FingerWorks—Tips for Typing on the Mini," obtained from http://www.fingerworks.com/mini_typing.html, generated on Aug. 27, 2004, 2-pgs.
"iGesture Pad—the MultiFinger USB TouchPad with Whole-Hand Gestures," obtained from http://www.fingerworks.com/igesture.html, generated Aug. 27, 2004, 2-pgs.
Bier, et al., "Toolglass and Magic Lenses: The see-through interface" In James Kijiya, editor, Computer Graphics (SIGGRAPH '93 Proceedings), vol. 27, pp. 73-80, Aug. 1993.
Douglas et al., *The Ergonomics of Computer Pointing Devices* (1997).
European Search Report received in EP 1 621 989 (@ *Beyer Weaver & Thomas, LLP*) dated Mar. 27, 2006.
EVB Elektronik "TSOP6238 IR Receiver Modules for Infrared Remote Control Systems" dated Jan. 2004 1-pg.
Fisher et al., "Repetitive Motion Disorders: The Design of Optimal Rate-Rest Profiles," Human Factors, 35(2):283-304 (Jun. 1993).
Fukumoto, et al., "ActiveClick: Tactile Feedback for Touch Panels," In CHI 2001 Summary, pp. 121-122, 2001.
Fukumoto and Yoshinobu Tonomura, "Body Coupled Fingering: Wireless Wearable Keyboard," *CHI 97*, pp. 147-154 (Mar. 1997).
Hardy, "Fingerworks" Mar. 7, 2002; BBC World On Line.
Hillier and Gerald J. Lieberman, *Introduction to Operations Research* (1986).
International Search Report dated Mar. 3, 2006 (PCT/US 05/03325; 119-0052WO).

Jacob et al., "Integrality and Separability of Input Devices," *ACM Transactions on Computer-Human Interaction*, 1:3-26 (Mar. 1994).
Kinkley et al., "Touch-Sensing Input Devices," in CHI '99 Proceedings, pp. 223-230, 1999.
Kionx "KXP84 Series Summary Data Sheet" coyright 2005,dated Oct. 21, 2005, 4-pgs.
Lee et al., "A Multi-Touch Three Dimensional Touch-Sensitive Tablet," in CHI '85 Proceedings, pp. 121-128, 2000.
Lee, "A Fast Multiple-Touch-Sensitive Input Device," Master's Thesis, University of Toronto (1984).
Matsushita et al., "HoloWall: Designing a Finger, Hand, Body and Object Sensitive Wall," In Proceedings of UIST '97, Oct. 1997.
Quantum Research Group "QT510 / QWheel™ Touch Slider IC" copyright 2004-2005, 14-pgs.
Quek, "Unencumbered Gestural Interaction," *IEEE Multimedia*, 3:36-47 (Winter 1996).
Radwin, "Activation Force and Travel Effects on Overexertion in Repetitive Key Tapping," *Human Factors*, 39(1): 130-140 (Mar. 1997).
Rekimoto "SmartSkin: An Infrastructure for Freehand Manipulation on Interactive Surfaces" CHI 2002, Apr. 20-25, 2002.
Rekimoto et al., "ToolStone: Effective Use of the Physical Manipulation Vocabularies of Input Devices," In Proc. Of UIST 2000, 2000.
Rubine et al., "Programmable Finger-Tracking Instrument Controllers," *Computer Music Journal*, vol. 14, No. 1 (Spring 1990).
Rutledge et al., "Force-To-Motion Functions For Pointing," Human-Computer Interaction—Interact (1990).
Subatai Ahmad, "A Usable Real-Time 3D Hand Tracker," Proceedings of the 28th Asilomar Conference on Signals, Systems and Computers—Part 2 (of2), vol. 2 (Oct. 1994).
Texas Instruments "TSC2003 / I2C Touch Screen Controller" Data Sheet SBAS 162, dated Oct. 2001, 20 pgs.
Wellner, "The Digital Desk Calculators: Tangible Manipulation on a Desk Top Display" In ACM UIST '91 Proceedings, pp. 27-34, Nov. 1991.
Williams, "Applications for a Switched-Capacitor Instrumentation Building Block" Linear Technology Application Note 3, Jul. 1985, pp. 1-16.
Yamada et al., "A Switched-Capacitor Interface for Capacitive Pressure Sensors," IEEE Transactions on Instrumentation and Measurement, vol. 41, No. 1, Feb. 1992, pp. 81-86.
Yeh et al., "Switched Capacitor Interface Circuit for Capacitive Transducers" 1985 IEEE.
Zhai et al., "Dual Stream Input for Pointing and Scrolling," *Proceedings of CHI '97 Extended Abstracts* (1997).
Zimmerman et al., "Applying Electric Field Sensing to Human-Computer Interfaces," In CHI '85 Proceedings, pp. 280-287, 1995.
U.S. Appl. No. 10/774,053, Filed on Feb. 5, 2004.
U.S. Appl. No. 11/140,529, filed May 27, 2005, which is a Reissue of 6,570,557 listed above (*see A152*).
U.S. Appl. No. 11/381,313, filed on May 2, 2006 entitled "Multipoint Touch Surface Controller".
U.S. Appl. No. 11/332,861, filed on Jan. 13, 2006 which is a Reissue of 6,677,932 listed above (*see A160*).
U.S. Appl. No. 11/380,109, filed on Apr. 25, 2006 entitled "Keystroke Tactility Arrangement On Smooth Touch Surface".
U.S. Appl. No. 11/428,501, filed on Jul. 3, 2006 entitled "Capacitive Sensing Arrangement," which is a Continuation of US 2005/0104867 listed above (*see A177*).
U.S. Appl. No. 11/428,503, filed on Jul. 3, 2006 entitled "Touch Surface" which is a Continuation of US 2005/0104867 listed above (*see A177*).
U.S. Appl. No. 11/428,506, filed on Jul. 3, 2006 entitled "User Interface Gestures" which is a Continuation of US 2005/0104867 listed above (*see A177*).
U.S. Appl. No. 11/428,515, filed on Jul. 3, 2006 entitled "User Interface Gestures" which is a Continuation of US 2005/0104867 listed above (*see A177*).
U.S. Appl. No. 11/428,522, filed on Jul. 3, 2006 entitled "Identifying Contacts on a Touch Surface" which is a Continuation of US 2005/0104867 listed above (*see A177*).

U.S. Appl. No. 11/428,521, filed on Jul. 3, 2006 entitled "Identifying Contacts on a Touch Surface" which is a Continuation of US 2005/0104867 listed above (*see A177*).

U.S. Appl. No. 11/426,078, filed on Jun. 23, 2006 entitled "Electronic Device Having Display and Surrounding Touch Sensitive Bezel For User Interface and Control" which is a Continuation-In-Part of 2006/0197753 listed above (*see A181*).

U.S. Appl. No. 11/278,080, filed on Mar. 30, 2006 entitled "Force Imaging Input Device and System".

U.S. Appl. No. 11/382,402, filed on May 9, 2006 entitled "Force and Location Sensitive Display" which is a Continuation of 11/278,080 listed above (*see C81*).

International Search Report received in corresponding PCT application No. PCT/US2006/008349 dated Oct. 6, 2006.

Chinese Office Action dated Aug. 15, 2008, referencing application No. 2007/10089810.9.

European Search Report dated Jul. 11, 2007 referencing application No. EP-07251121.

Chinese Office Action dated Jun. 6, 2008, referencing application No. 2007/10089811.3.

European Search Report dated Nov. 9, 2007 referencing application No. EP-07251126.

European Examination Report mailed Apr. 25, 2008, for EP Application No. 07251121.5, filed Mar. 16, 2007, two pages.

European Examination Report mailed Apr. 25, 2008, for EP Application No. 07251126.4, filed Mar. 16, 2007, two pages.

European Examination Report dated Jul. 19, 2007, for EP Application No. 07251126.4, filed Mar. 16, 2007, five pages.

Final Office Action mailed Aug. 4, 2008, for U.S. Appl. No. 11/278,080, filed Mar. 30, 2006, eight pages.

Non-Final Office Action mailed Mar. 11, 2008, for U.S. Appl. No. 11/278,080, filed Mar. 30, 2006, 15 pages.

* cited by examiner

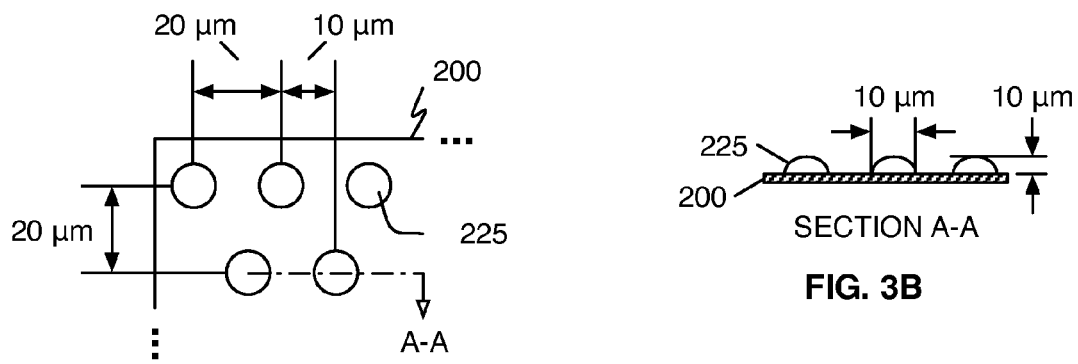
FIG. 3A
FIG. 3B
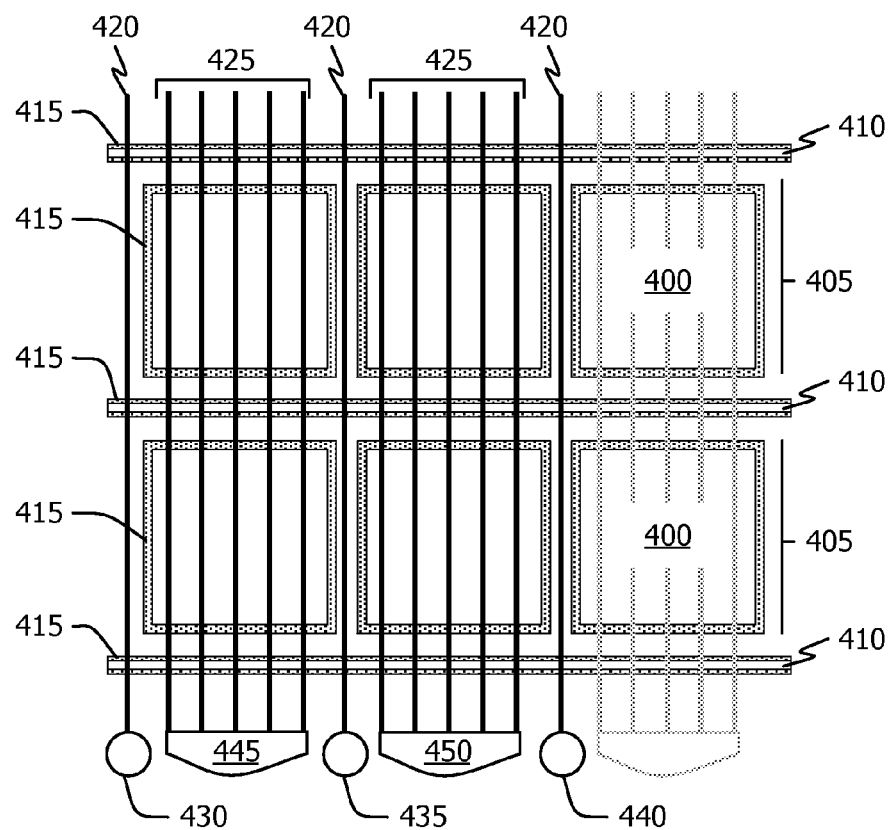
FIG. 4

FORCE AND LOCATION SENSITIVE DISPLAY

CROSS REFERENCE To RELATED APPLICATION

This application is a continuation-in-part of U.S. patent application Ser. No. 11/278,080 entitled "Force Imaging Input Device and System," filed 30 Mar. 2006 and which are hereby incorporated by reference.

BACKGROUND

This invention relates generally to electronic system input and output devices and, more particularly, to a display unit (output) that detects a user's touch and the force of the touch (input).

There exist today many styles of input devices for performing operations in a computer system. The operations generally include moving a cursor and/or making selections on a display screen. By way of example, input devices may include buttons or keys, mice, trackballs, touch pads, joy sticks and touch screens. Touch screens, in particular, are becoming increasingly popular because of their ease and versatility of operation as well as to their declining price. Touch screens allow a user to make selections and move a cursor by simply touching the display screen via a finger or stylus. In general, the touch screen recognizes the touch and position of the touch on the display screen and the computer system interprets the touch and thereafter performs an action based on the touch event.

Touch screens typically include a touch panel, a controller and a software driver. The touch panel is a clear panel with a touch sensitive surface and is positioned in front of a display screen so that the touch sensitive surface covers the viewable area of the display screen. The touch panel registers touch events and sends these signals to the controller. The controller processes these signals and sends the data to the computer system. The software driver translates the touch events into computer events.

There are several types of touch screen technologies including resistive, capacitive, infrared, surface acoustic wave, electromagnetic, near field imaging, etc. Each of these devices has advantages and disadvantages that are taken into account when designing or configuring a touch screen. In resistive technologies, the touch panel is coated with a thin metallic electrically conductive and resistive layer. When the panel is touched, the layers come into contact thereby closing a "switch" that registers the position of the touch event. This information is sent to the controller for further processing. In capacitive technologies, the touch panel is coated with a material that stores electrical charge. When the panel is touched, a small amount of charge is drawn to the point of contact. Circuits co-located with the panel measure the charge and send the information to the controller for processing.

In surface acoustic wave technologies, ultrasonic waves are sent horizontally and vertically over the touch screen panel as for example by transducers. When the panel is touched, the acoustic energy of the waves are absorbed. Sensors located across from the transducers detect this change and send the information to the controller for processing. In infrared technologies, light beams are sent horizontally and vertically over the touch panel as for example by light emitting diodes. When the panel is touched, some of the light beams emanating from the light emitting diodes are interrupted. Light detectors located across from the light emitting diodes detect this change and send this information to the controller for processing.

One drawback to these technologies is that they do not generally provide pressure or force information. Force information may be used to obtain a more robust indication of how a user is manipulating a device. That is, force information may be used as another input dimension for purposes of providing command and control signals to an associated electronic device (e.g., a tablet computer system, personal digital assistant or a mobile phone). Another problem with these technologies is that they are only capable of reporting a single point even when multiple objects are placed on the sensing surface. That is, they lack the ability to track multiple points of contact simultaneously. Thus, it would be beneficial to provide an input display unit that is capable of detecting both the location of a touch and the force with which that touch is applied.

SUMMARY

A unit to provide both force and location detection includes a first transparent substrate (having first and second sets of conductive traces oriented in a first direction), a second transparent substrate (having a third set of conductive traces oriented in a second direction) and a plurality of deformable members (e.g., rubber beads) juxtaposed between the first and second transparent substrates. The first set of conductive traces, in combination with the conductive traces of the second transparent element, are configured to provide a capacitance signal representing where a user touches the display element. The second set of conductive traces, in combination with the conductive traces of the second transparent element, are configured to provide a capacitance signal representing the amount of force applied to the display element. In one embodiment, the second transparent substrate includes a fourth plurality of conductive traces (oriented in the second direction), each pair of which separates sets of the third plurality of conductive traces. In another embodiment, the two transparent substrates form a closed volume that may be filled with a liquid to mitigate visual aspects of the deformable members. The described force and location sensitive unit may be abutted to a display element (e.g., a LCD or CRT) so that a display unit providing both location sensing and force sensing is possible.

BRIEF DESCRIPTION OF THE DRAWINGS

FIGS. 3A and 3B show various views of compressible media elements in accordance with one embodiment of the invention.

FIG. 4 shows the layout of conductive traces in accordance with one embodiment of the invention.

DETAILED DESCRIPTION

The following description is presented to enable any person skilled in the art to make and use the invention as claimed and is provided in the context of the particular examples discussed below, variations of which will be readily apparent to those skilled in the art. Accordingly, the claims appended hereto are not intended to be limited by the disclosed embodiments, but are to be accorded their widest scope consistent with the principles and features disclosed herein.

Figure 1:
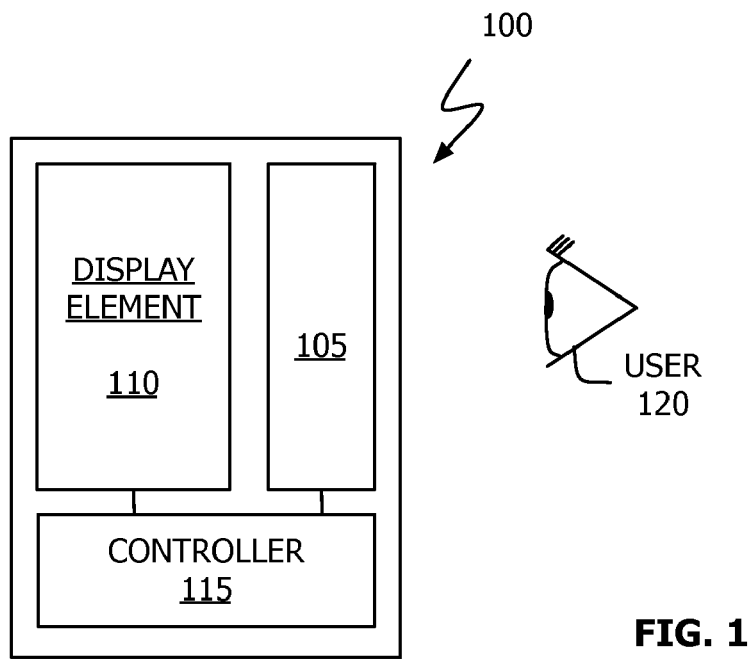
FIG. 1 shows, in block diagram form, a display unit in accordance with one embodiment of the invention.

Referring to FIG. 1, force and location display unit 100 in accordance with one embodiment of the invention comprises novel force and touch cell 105, display element 110 and controller 115. As shown, cell 105 is juxtaposed in front of display element 110 (from the perspective of user 120). For example, cell 105 may be laminated to the front of display element 110. Illustrative display element 110 includes, but is not limited to, various types of liquid crystal displays ("LCD", plasma displays and cathode ray tubes ("CRT"). Functionally, controller 115 is similar to prior art controllers in that it provides signals to drive cell 105 and to relay and/or process signals received from cell 105 to a host computer (not shown). Such signals represent where and with how much force user 120 used to touch display 100. In another embodiment, display unit 100 may include, for example, a polarizer element between cell 105 and display element 110. Alternatively, the polarizer may be placed outside bell 105 to enhance the perceived contrast ratio of the display unit.

Figure 2:
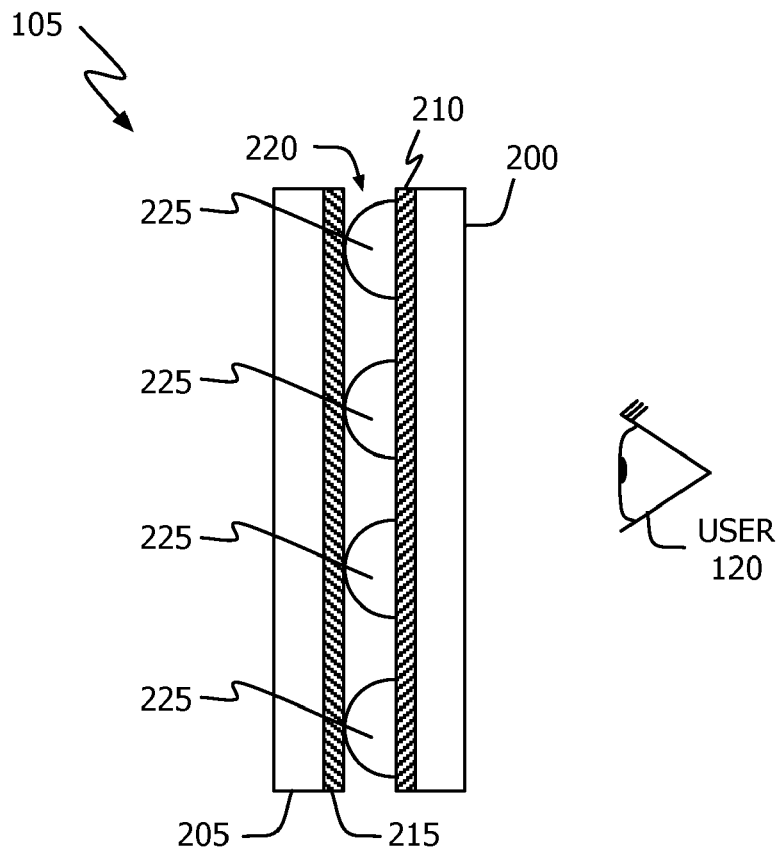
FIG. 2 shows, in block diagram form, a force and touch cell in accordance with one embodiment of the invention.

Referring to FIG. 2, novel force and touch cell 105 of FIG. 1 comprises first and second clear substrates (200 and 205), each of which has abutted to one surface a pattern of conductive traces (210 and 215) and which are separated by volume 220. Volume 220 includes a plurality of compressible media elements 225 which permit substrates 200 and 205 to move closer to one another as user 120 presses on display 100. In combination with drive signals from controller 115 (see FIG. 1) and conductive traces 210 and 215, as the separation between substrates 200 and 205 changes, so does the mutual capacitance between traces 210 and 215. It is the change in capacitance signals detected by controller 115 that represent where, and with how much force, user 120 touches display 100.

In one embodiment, clear substrates 200 and 205 comprise glass or optically clear plastic between approximately 0.3 to 0.5 millimeters ("mm") in thickness and may be of the type typically used in liquid crystal displays. Conductive traces 210 and 215 comprise patterned indium tin oxide or some other optically transparent or translucent conductor. Compressible media elements 225 may, for example, comprise polyurethane or silicone rubber in the form of elastomer dots or beads.

It has been found that the capacitance change between conductive traces 210 and 215 may be easily detected using glass substrates of the thickness identified above and separated by between approximately 2 to 20 microns ("μm"). Accordingly, in one embodiment compressible media elements 225 comprise elastomer dots that span the gap from substrate 200 to substrate 205 (minus the thickness of conductive traces 210 and 215). By way of example, if substrate 200 is separated from substrate 205 by 10 μm, compressible media elements may be arranged and spaced as shown in FIGS. 3A and 3B. In one embodiment, compressible media elements may be applied to substrate 200 or 205 via a photolithographic or silk-screening process. In another embodiment, compressible media elements may be applied to both substrate 200 and 205. In this later implementation, the dots or beads formed on a first substrate (e.g., substrate 200) could be juxtaposed between dots or beads formed on the second substrate (e.g., substrate 205) so that, together, the pattern illustrated in FIG. 3 would be constructed. It will be recognized by those of ordinary skill that other patterns are possible without departing from the concepts described herein.

While not required, in one embodiment volume 220 is closed in a manner that permits fluid to fill the region between substrate 200 (and conductive traces 210) and substrate 205 (and conductive traces 215). One benefit of this configuration is that the refractive index of the fluid may be matched with the refractive index of the compressible media elements. When this is done, Snell's law ensures that the compressible media elements will appear to vanish from a user's point of view and, as a consequence, not distract from the user's view of whatever is being presented on display element 110. One illustrative optical fluid is SL-5267 from SantoLight. One of ordinary skill in the art will recognize that thin-film reflective coatings may be applied to each interface to reduce the loss of light and mitigate refractive distortions. Illustrative antireflective coatings may contain magnesium fluoride, aluminum oxides, etc. and are typically applied in thicknesses of approximately 50 to 200 nanometers.

Referring to FIG. 4, the layout for conductive traces 210 and 215 are shown in accordance with one embodiment of the invention. In the illustrated embodiment, "top" traces 210 (i.e., those closest to user 120) comprise rows of pixel plates 400, drive frames 405 and inverted drive lines 410—each of which is electrically isolated by regions having no conductive material 415. "Bottom" traces 215 (i.e., those furthest from user 120) comprise sense lines associated with force detection operations (420) and sense lines associated with location detection operations (425). As shown in the illustrated embodiment, each force detection trace 420 has an output pad (430, 435 and 440) while a plurality of location detection traces 425 share a common output pad (445 and 450).

Figure 5A:
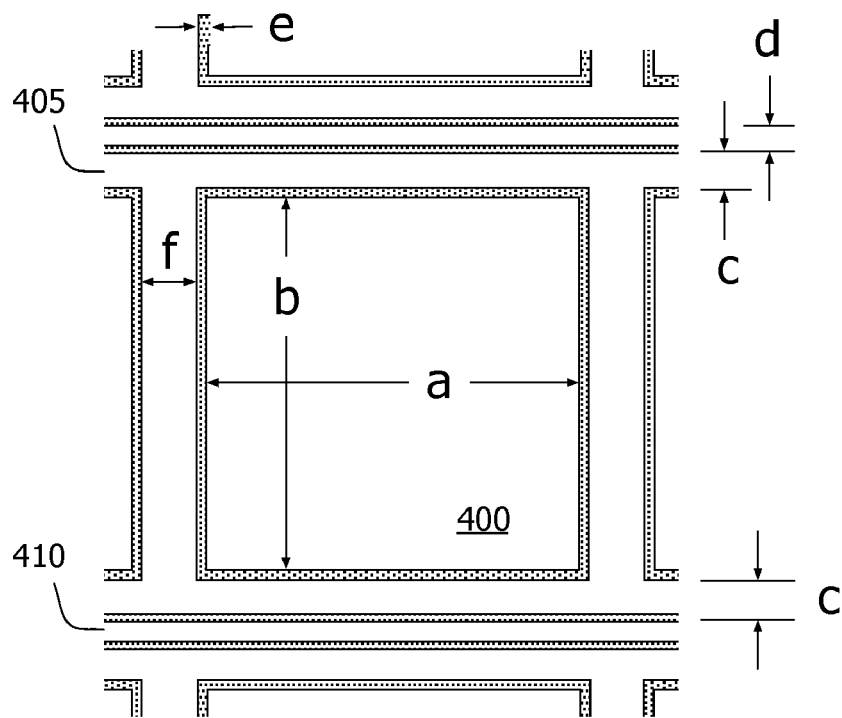
FIGS. 5A and 5B show an expanded view of the architecture set forth in FIG. 4.
Figure 5B:
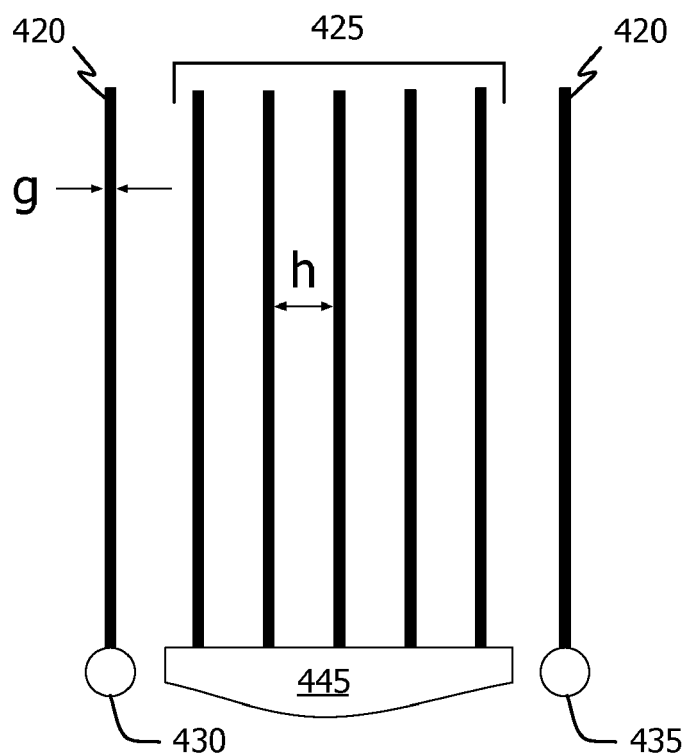

Referring to FIGS. 5A and 5B, a more detailed view of the architecture of FIG. 4 is provided. For one embodiment, the dimensions 'a' through 'h' identified in FIGS. 5A and 5B are listed in Table 1.

TABLE 1

| | Illustrative Dimensions | |
|---|---|---|
| Label | Description | Size |
| a | Capacitive plate (400) | 4 mm |
| b | Capacitive plate (400) | 4 mm |
| c | Drive frame - inverted drive line separation | 0.25 mm |
| d | Inverted drive line (410) | 0.25 mm |
| e | Conductive trace separation | 30 μm |
| f | Capacitive plate separation | 0.25 mm |
| g | Sense trace width | 300 μm |
| h | Sense trace (425) separation | 0.67 mm |

It will be recognized that the precise size of each element is a design decision that may be determined by the size of the display area (e.g., unit 100) and the desired resolution. It will also be recognized that overlapping conductive traces 210 (e.g., trace 425) and 220 (e.g., traces 430 and 435) form capacitive elements that operate in a manner described in the aforementioned pending patent application.

It is noted that in the architecture illustrated in FIGS. 4 and 5, traces 210 substantially cover one surface of clear substrate 200 while traces 215 only minimally cover one surface of clear substrate 205. As a result, a user may see visual artifacts caused by the difference in the index of refraction between the surface of substrate 200 substantially coated with conductive traces and the surface of substrate 205 which is only minimally coated. To reduce these visual artifacts, it has been found beneficial to coat the surface of substrate 205 continuously with the transparent or translucent conductive trace material which has a similar index of refraction as the conductive trace material. For example, the same surface of substrate 205 that includes traces 215 (e.g., traces 420 and 425), may be coated with the same conductive material as long as this coating is electrically isolated from traces 215. This can be done, for example, by providing a insulating barrier (e.g., 415) around each trace 215. Other illustrative materials suitable for this purpose include, but are not limited to, aluminum oxide, scandium oxide or optiNDEX (a polymer coating) from Brewer Science.

Figure 6:
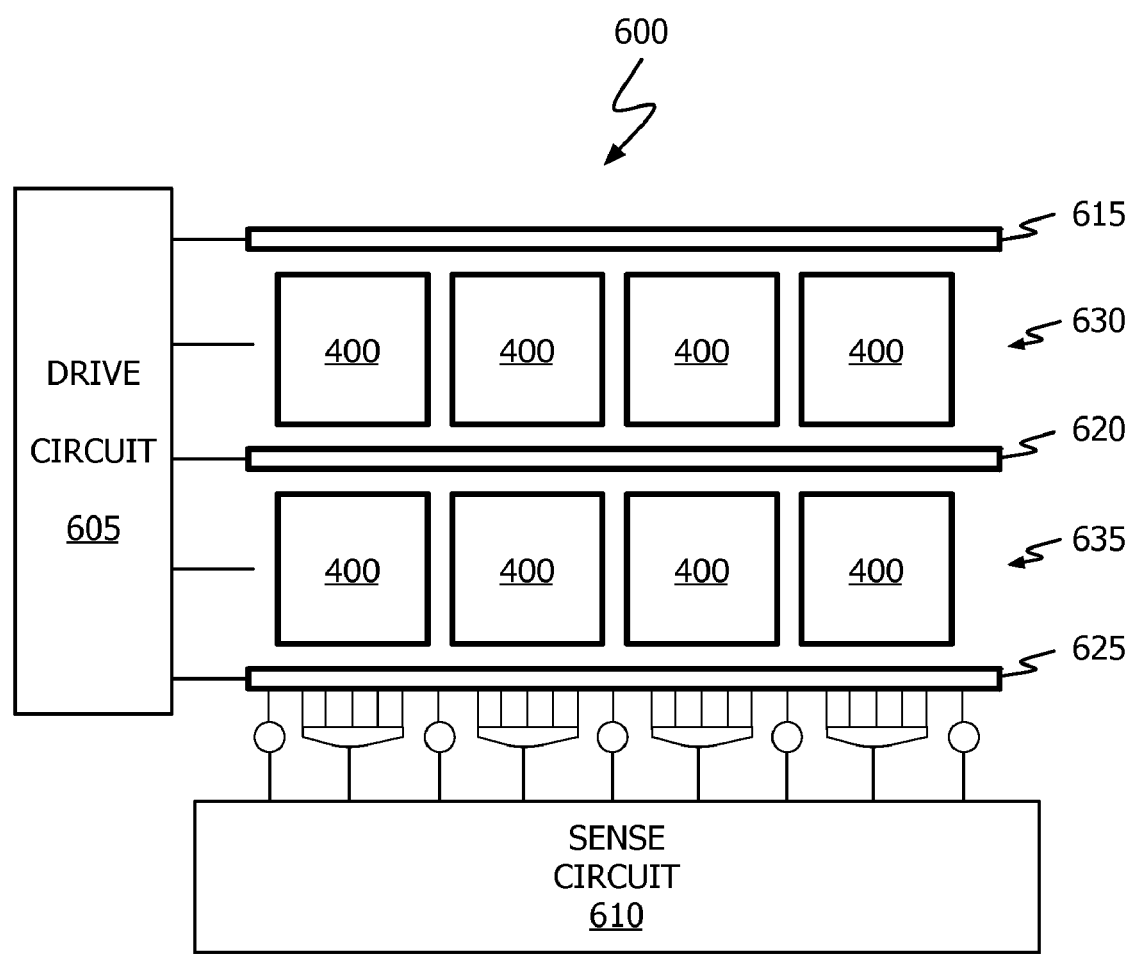
FIG. 6 shows, in schematic form, a force and touch sensitive display in accordance with one embodiment of the invention.

Referring to FIG. 6, a portion of force and location sensitive display unit 600 is shown in schematic form. In accordance with one embodiment of the invention, during operation drive circuit 605 stimulates each combination of inverted drive lines and a drive frame in sequence while simultaneously sensing all force and location associated traces via sense circuit 610. For example, during a first time period ($T_1$) inverted drive lines 615 and 620 are driven with a pulse train of a first polarity while drive frame 630 is driven with a pulse train of an opposite polarity. While this is occurring, sense circuit 610 "reads" or senses each of its inputs across all columns of the display. During a second time period ($T_2$), inverted drive lines 620 and 625 are driven with a pulse train of the first polarity while drive frame 635 is driven with a pulse train of the opposite polarity. During time period $T_2$, sense circuit 610 again reads each of its inputs. This process is repeated until all rows in the display unit have been driven, after which the process repeats. As described, each pixel generates one signal related to a location measurement (e.g., through common sense pad 445) and two signals related to force measurement (e.g., from pads 430 and 435). In one embodiment, the average of the measure force signals is used as "the" force signal. In another embodiment, the maximum (or minimum) of the two signals is used.

In one embodiment, each pulse train comprises 12 pulses (0 to 18 volts), having a 50% duty cycle and a frequency of between approximately 100 and 300 Kilohertz ("KHz"). In the embodiment of FIG. 6, sense circuit 610 is shown as simultaneously reading all column inputs. It will be recognized, however, that this is not necessary. For example, the operation of sensing a row's change in capacitance signals could be multiplexed so that for each row (e.g., inverted drive lines 615 and 620 and drive frame 640), a first portion of columns are sensed during a first time period, a second portion of columns are sensed during a second time period and so on until all columns are sensed. After this process is completed, the next set of inverted drive lines and drive frame may be stimulated.

In accordance with the invention, the illustrative architecture of FIGS. 4, 5 and 6 provide two values for each pixel during each scan operation (see discussion above). A first value represents the capacitance due to where the user touches the display unit. This value should be as independent of force as possible. The second value represents the force applied to the display unit. This value should be as independent of where the force is applied as possible. The arrangement of drive frames 405, inverted drive lines 410 and sensing lines 420 and 425 are arranged to provide this independence. For example, it will be recognized that the mutual capacitance between a drive frame (e.g., 405) and a force output line (e.g., one of conductive paths 420) is directly proportional to their overlap area (e.g., 30 μm×4.5 mm) and inversely proportional to plate separation (e.g., 10 μm at no force and 7 μm at full force). The same is true for each inverted drive line. However, because drive frames and inverted drive lines are driven with opposite polarity signals, they tend to counteract one another (that is, the different polarities tend to counteract the charge transferred between the sensing path and drive frame and between the sensing path and the inverted drive frame). Thus, in the illustrated embodiment, inverted drive lines are used to cancel some of the charge transfer due to location sensing paths 425 overlapping the "legs" of drive frame 405. Thus, the use of inverted drive lines ensures that the location and force output signals are substantially independent.

Various changes in the materials, components, circuit elements, as well as in the details of the illustrated operational methods are possible without departing from the scope of the following claims.

The invention claimed is:

1. A force and touch sensitive component, comprising:
a first transparent layer;
a second transparent layer;
first conductive traces abutted to a first surface of the first transparent layer;
second conductive traces abutted to a second surface of the second transparent layer; and
deformable members interposed between the first and second transparent layers, wherein
the first and second conductive traces are configured to generate a first set of signals on a first set of the first and second conductive traces indicative of a force applied to the first transparent layer and a second set of signals on a second set of the first and second conductive traces different than the first set of the first and second conductive traces indicative of a location on the first transparent layer at which the force is applied.

2. The component of claim 1, wherein the first and second transparent layers comprise glass.

3. The component of claim 1, wherein the first conductive traces are oriented in a first direction and the second conductive traces are oriented in a second direction.

4. The component of claim 3, wherein the first and second directions are substantially orthogonal.

5. The component of claim 1, wherein the second conductive traces comprise:
a first set of traces dedicated to detection of signals indicative the force applied to the first transparent layer; and
a second set of conductive traces dedicated to detection of signals indicative of the location of the applied force.

6. The component of claim 1, wherein the first and second transparent layers comprise a sealed volume.

7. The component of claim 6, wherein the sealed volume is substantially filled with a fluid having an index of refraction.

8. The component of claim 7, wherein the index of refraction of the fluid is substantially equal to an index of refraction of the deformable members.

9. The component of claim 1, further comprising a polarizer element abutted to at least one surface of the first and second transparent layers, wherein the at least one surface is opposite that surface abutted by the first or second plurality of conductive traces.

10. The component of claim 9, wherein the polarizer element comprises an optical coating.

11. A force and location sensitive touch component, comprising:
a first transparent layer;
a second transparent layer;
a first plurality of conductive traces oriented in a first direction and substantially adjacent to a first surface of the first transparent layer;
a second plurality of conductive traces oriented in a second direction and substantially adjacent to a first surface of the second transparent layer;

a third plurality of conductive traces oriented in the second direction, substantially adjacent to the first surface of the second transparent layer and electrically isolated from the second plurality of conductive traces, one or more of which are arranged between successive ones of the second plurality of conductive traces; and a plurality of deformable members juxtaposed between the first surfaces of the first and second transparent layers, wherein the first and second plurality of conductive traces are adapted to provide an indication of a force applied to the first surface of the first transparent layer and the first and third plurality of conductive traces are adapted to provide an indication of a location on the first transparent layer at which the force is applied.

12. The force and location sensitive touch component of claim 11, wherein each of the first plurality of conductive traces comprises a first portion adapted to receive a drive signal and a plurality of second portions that are electrically isolated from the first portion.

13. The force and location sensitive touch component of claim 12, wherein the drive signal comprises a limited duration pulse train.

14. The force and location sensitive touch component of claim 12, wherein each of the first plurality of conductive traces are adapted to receive the drive signal during a time when others of the first plurality of conductive traces do not receive the drive signal.

15. The force and location sensitive touch component of claim 11, further comprising a fourth plurality of conductive traces oriented in the first direction and substantially adjacent to the second surface of the first transparent layer, wherein each of the fourth plurality of conductive traces are arranged between successive ones of the first plurality of conductive traces.

16. The force and location sensitive touch component of claim 15, wherein each of the first plurality of conductive traces are adapted to receive a first drive signal having a first polarity and each of the fourth plurality of conductive traces are adapted to receive a second drive signal having a second polarity.

17. The force and location sensitive touch component of claim 16, wherein each of the first plurality of conductive traces are adapted to receive the first drive signal during a time when others of the first plurality of conductive traces do not receive the first drive signal.

18. The force and location sensitive touch component of claim 17, wherein each pair of the fourth plurality of conductive traces are adapted to receive the second drive signal only when the one of the first plurality of conductive traces arranged between said pair receive the first drive signal.

19. The force and location sensitive touch component of claim 11, wherein the deformable members comprise rubber.

20. The force and location sensitive touch component of claim 11, wherein the deformable members comprise room temperature vulcanizing rubber.

21. The force and location sensitive touch component of claim 11, wherein the deformable members comprise silicone.

22. The force and location sensitive touch component of claim 11, wherein the deformable members comprise a light cured elastomer.

23. The force and location sensitive touch component of claim 11, wherein the first and second transparent layers form a closed volume.

24. The force and location sensitive touch component of claim 23, wherein the first surfaces of the first and second transparent layers are inside the closed volume.

25. The force and location sensitive touch component of claim 23, further comprising a fluid filling the closed volume.

26. The force and location sensitive touch component of claim 25, wherein the fluid has an index of refraction approximately equal to an index of refraction of the deformable members.

27. The force and location sensitive touch component of claim 25, wherein the fluid comprises a fluid having an index of refraction similar to the deformable members.

28. The force and location sensitive touch component of claim 11, further comprising a dielectric material substantially covering the first surface of the first transparent layer, the dielectric material having an index of refraction approximately equal to an index of refraction of the first plurality of conductive traces.

29. The force and location sensitive touch component of claim 28 wherein the first plurality of conductive traces comprise Indium tin oxide and the dielectric material comprises aluminum oxide.

30. The force and location sensitive touch component of claim 11, further comprising a dielectric material substantially covering the first surface of the second transparent layer, the dielectric material having an index of refraction approximately equal to an index of refraction of the second and third plurality of conductive traces.

31. The force and location sensitive touch component of claim 30 wherein the second and third plurality of conductive traces comprise Indium tin oxide and the dielectric material comprises aluminum oxide.

32. The force and location sensitive touch component of claim 11, wherein the first and second transparent layers comprise glass.

33. A display unit, comprising:
a display element; and
a force and location sensitive touch component in accordance with claim 11 adhered to a surface thereof.

34. The display unit of claim 33, wherein the display element comprises a liquid crystal display.

35. The display unit of claim 33, wherein the display element comprises a cathode ray tube.

36. The display unit of claim 33, wherein the display element comprises a plasma display.

37. The display unit of claim 33, further comprising a polarizer element juxtaposed between the display element and force and location sensitive touch component.

38. A force and location sensitive component, comprising:
a first transparent substrate having separate first and second pluralities of conductive paths oriented in a first direction;
a second transparent substrate having a third plurality of conductive paths oriented in a second direction; and
deformable elements juxtaposed between and separating the first and second transparent substrates, wherein
the first and third plurality of conductive paths are configured to generate capacitance signals representing a location on a display unit being touched by a user and the second and third plurality of conductive paths are configured to generate capacitance signals representing a force applied to the display unit by the user.

39. The force and location sensitive component of claim 38, further comprising a display element abutted to the first transparent substrate.

40. The force and location sensitive component of claim 39, wherein the display element comprises a liquid crystal display element.

41. The force and location sensitive component of claim 38, wherein the first plurality of conductive paths comprise a plurality of electrically isolated paths, between which are one or more of the second plurality of conductive paths.

42. The force and location sensitive component of claim 41, wherein each of the first plurality of conductive paths are electrically isolated from one another and all of the one or more second plurality of conductive paths between each of the first plurality of conductive paths are electrically coupled.

43. The force and location sensitive component of claim 38, wherein the second transparent membrane further comprises a fourth plurality of conductive paths oriented in the second direction and electrically isolated from the third plurality of conductive paths.

44. The force and location sensitive component of claim 43, wherein the third plurality of conductive paths are separated from one another by one of the fourth plurality of conductive paths.

45. The force and location sensitive component of claim 43, wherein the third plurality of conductive paths is configured to be driven by a voltage signal having a first polarity and the fourth plurality of conductive paths is configured to be driven by a voltage signal having a second polarity.

46. The force and location sensitive component of claim 38, wherein the first, second and third plurality of conductive paths comprise indium tin oxide.

47. The force and location sensitive component of claim 38, wherein the deformable elements comprise a rubber.

48. The force and location sensitive component of claim 39 further comprising a polarizer juxtaposed between the display element and the first transparent substrate.

49. The force and location sensitive component of claim 38, wherein the first and second transparent substrates comprise a closed volume.

50. The force and location sensitive component of claim 49, further comprising liquid substantially filling the closed volume.

51. The force and location sensitive component of claim 50, wherein the liquid has an index of refraction substantially equal to that of the deformable members.

* * * * *